United States Patent
Yoshida

(10) Patent No.: US 11,384,223 B2
(45) Date of Patent: Jul. 12, 2022

(54) FLUORORUBBER COMPOSITION AND FLUORORUBBER CROSSLINKED PRODUCT

(71) Applicant: NOK CORPORATION, Tokyo (JP)

(72) Inventor: Suguru Yoshida, Fujisawa (JP)

(73) Assignee: NOK CORPORATION, Tokyo (JP)

(*) Notice: Subject to any disclaimer, the term of this patent is extended or adjusted under 35 U.S.C. 154(b) by 50 days.

(21) Appl. No.: 16/702,965

(22) Filed: Dec. 4, 2019

(65) Prior Publication Data

US 2020/0109262 A1    Apr. 9, 2020

Related U.S. Application Data

(63) Continuation of application No. PCT/JP2018/019449, filed on May 21, 2018.

(30) Foreign Application Priority Data

Jun. 6, 2017  (JP) .............................. JP2017-111651

(51) Int. Cl.
| | |
|---|---|
| C08K 9/06 | (2006.01) |
| C08J 3/20 | (2006.01) |
| C08J 3/24 | (2006.01) |
| C08L 23/24 | (2006.01) |
| C08L 27/18 | (2006.01) |
| C08L 27/16 | (2006.01) |
| C08L 27/12 | (2006.01) |
| C08L 27/22 | (2006.01) |
| C09J 127/16 | (2006.01) |
| C09J 127/18 | (2006.01) |
| C09J 127/12 | (2006.01) |
| C09J 127/22 | (2006.01) |
| C08K 3/26 | (2006.01) |
| C08K 3/36 | (2006.01) |
| C08K 3/22 | (2006.01) |

(52) U.S. Cl.
CPC ................ C08K 9/06 (2013.01); C08J 3/203 (2013.01); C08J 3/246 (2013.01); C08K 3/26 (2013.01); C08K 3/36 (2013.01); C08L 23/24 (2013.01); C08L 27/12 (2013.01); C08L 27/16 (2013.01); C08L 27/18 (2013.01); C08L 27/22 (2013.01); C09J 127/12 (2013.01); C09J 127/16 (2013.01); C09J 127/18 (2013.01); C09J 127/22 (2013.01); C08J 2327/12 (2013.01); C08J 2327/16 (2013.01); C08J 2327/18 (2013.01); C08J 2327/22 (2013.01); C08J 2427/12 (2013.01); C08J 2427/16 (2013.01); C08J 2427/18 (2013.01); C08J 2427/22 (2013.01); C08K 2003/2296 (2013.01); C08K 2003/267 (2013.01); C08L 2205/025 (2013.01); C08L 2312/00 (2013.01)

(58) Field of Classification Search
None
See application file for complete search history.

(56) References Cited

U.S. PATENT DOCUMENTS

| | | | |
|---|---|---|---|
| 5,244,958 A | | 9/1993 | Goodman |
| 5,565,275 A | * | 10/1996 | Schmidt .................... C08J 5/12 428/447 |
| 2010/0036039 A1 | | 2/2010 | Sano |
| 2013/0281598 A1 | | 10/2013 | Kourtakis |
| 2014/0031461 A1 | | 1/2014 | Yamanaka et al. |
| 2015/0353720 A1 | | 12/2015 | Yamanaka et al. |

FOREIGN PATENT DOCUMENTS

| | | |
|---|---|---|
| CN | 101412835 A | 4/2009 |
| CN | 101516990 A | 8/2009 |
| CN | 103443197 A | 12/2013 |
| CN | 107778734 A | 3/2018 |
| EP | 2 682 426 A1 | 1/2014 |
| JP | 5-112677 A | 5/1993 |
| JP | 2006-299224 A | 11/2006 |
| JP | 2015-124640 A | 7/2015 |
| WO | 2006/006468 A1 | 1/2006 |
| WO | 2013/158386 A1 | 10/2013 |
| WO | WO 2016/202359 A1 * | 12/2016 |

OTHER PUBLICATIONS

English abstract of KR 1009745 B1, Jan. 19, 2011, 11 pages, Korea.*
6 pages product brochure of Viton by Chemours, copyrighted 2016.*
2 pages product brochure of Viton GLT305 by MatWeb, Downloaded on Apr. 2, 2021.*
Data sheet for TAIC DLC-A by Natrochem, Inc., GA, USA, 1 page, Nov. 26, 2003.*
English abstract of CN 103923419 A, Jul. 17, 2014, China.*
1 page brochure fo Sillitin N85 by Hoffmann Mineral GmbH, Jul. 3, 2010.*
Chinese Office Action dated Apr. 15, 2020 for corresponding Chinese Application No. 201880037566.8 and English translation.
Extended European Search Report dated Feb. 2, 2021 for corresponding European Application No. 18813285.6.
First Office Action dated Feb. 4, 2021 for corresponding Korean Application No. 10-2019-7036184 and English translation.
Second Chinese Office Action dated Sep. 21, 2020 for corresponding Chinese Application No. 201880037566.8 and English translation.

(Continued)

*Primary Examiner* — Tae H Yoon
(74) *Attorney, Agent, or Firm* — Pearne & Gordon LLP

(57) ABSTRACT

A fluororubber composition containing a ternary fluororubber polymer including vinylidene fluoride, perfluorovinyl ether and tetrafluoroethylene; a reaction product of silica-aluminum silicate with vinyl ethoxysilane; and hydrotalcite. The fluororubber composition does not substantially contain magnesium oxide and calcium hydroxide. The fluororubber composition contains 2 to 55 parts by weight of the reaction product of silica-aluminum silicate with vinyl ethoxysilane and 0.5 to 10 parts by weight of the hydrotalcite relative to 100 parts by weight of the ternary fluororubber polymer.

14 Claims, No Drawings

(56) References Cited

OTHER PUBLICATIONS

International Search Report for corresponding International Application No. PCT/JP2018/019449 dated Aug. 21, 2018 and English translation.
Written Opinion for corresponding International Application No. PCT/JP2018/019449 dated Aug. 21, 2018.
Notice of Allowance dated Jan. 7, 2019 in corresponding Japanese Application No. 2018-558784 and English translation.

* cited by examiner

FLUORORUBBER COMPOSITION AND FLUORORUBBER CROSSLINKED PRODUCT

CROSS REFERENCE TO RELATED APPLICATIONS

This is a continuation application of International Patent Application No. PCT/JP2018/019449 filed May 21, 2018, which claims the benefit of Japanese Patent Application No. 2017-111651 filed Jun. 6, 2017, and the full contents of all of which are hereby incorporated by reference in their entirety.

BACKGROUND

Technical Field

The present disclosure relates to a fluororubber composition and a fluororubber crosslinked product, and particularly relates to a fluororubber composition and a fluororubber crosslinked product which exhibit excellent adhesiveness, exhibit an excellent permanent compression set in a steam environment, and prevent a change in hardness in a steam environment.

Description of the Related Art

Conventionally, there has been known an exhaust gas recirculation (EGR) valve recirculating a part of exhaust gas discharged from a combustion chamber of an internal-combustion engine to an intake system of the internal-combustion engine (Japanese Patent Application Publication No. 2015-124640).

The EGR valve includes an oil sealing for preventing the leak of the exhaust gas (also referred to as EGR gas).

A fluororubber having excellent heat resistance and chemical resistance is used for the oil sealing because of a severe environment where an inner part of the EGR valve is in contact with exhaust gas and condensed water (International Publication No. WO2006/006468 (fluororubber composition)).

Since the oil sealing is also exposed to steam, steam resistance is also required for the oil sealing. A fluororubber subjected to polyol crosslinking generally has inferior steam resistance attributable to MgO blended as an acid acceptor. Therefore, in a steam environment, a peroxide-crosslinking-based fluororubber is used.

In a peroxide vulcanization-based fluororubber, metal oxides are used in order to improve adhesiveness, but the use of the metal oxides causes curing deterioration in a steam environment and settling of an oil sealing (a decrease in a permanent compression set).

Therefore, there is conventionally desired a fluororubber composition which exhibits excellent adhesiveness, exhibits an excellent permanent compression set in a steam environment, and prevents a change in hardness in a steam environment.

SUMMARY

The present disclosure is related to providing a fluororubber composition and a fluororubber crosslinked product which exhibit excellent adhesiveness, exhibit an excellent permanent compression set in a steam environment, and prevent a change in hardness in a steam environment.

Solution to Problem

According to an aspect of the present disclosure, a fluororubber composition contains a ternary fluororubber polymer including vinylidene fluoride, perfluorovinyl ether and tetrafluoroethylene; and a reaction product of silica-aluminum silicate with vinyl ethoxysilane. The fluororubber composition does not substantially contain magnesium oxide and calcium hydroxide. The fluororubber composition contains 8 to 60 parts by weight of the reaction product of silica-aluminum silicate with vinyl ethoxysilane relative to 100 parts by weight of the ternary fluororubber polymer.

According to another aspect of the present disclosure, a fluororubber composition contains a ternary fluororubber polymer including vinylidene fluoride, perfluorovinyl ether and tetrafluoroethylene; a reaction product of silica-aluminum silicate with vinyl ethoxysilane; and hydrotalcite. The fluororubber composition does not substantially contain magnesium oxide and calcium hydroxide. The fluororubber composition contains 2 to 55 parts by weight of the reaction product of silica-aluminum silicate with vinyl ethoxysilane and 0.5 to 10 parts by weight of the hydrotalcite relative to 100 parts by weight of the ternary fluororubber polymer.

Further, it is preferable that the ternary fluororubber polymer has a fluoride content of 64 to 67% by weight.

According to another aspect of the present disclosure, a fluororubber crosslinked product is obtained by crosslinking the fluororubber composition.

The present disclosure can provide a fluororubber composition and a fluororubber crosslinked product which exhibit excellent adhesiveness, exhibit an excellent permanent compression set in a steam environment, and prevent a change in hardness in a steam environment.

DETAILED DESCRIPTION

Hereinafter, an embodiment of the present disclosure will be described with reference to the drawings. First, a fluororubber composition according to a first aspect of the present disclosure will be described.

The fluororubber composition according to the first aspect contains: a ternary fluororubber polymer including vinylidene fluoride, perfluorovinyl ether and tetrafluoroethylene; and a reaction product of silica-aluminum silicate with vinyl ethoxysilane. The fluororubber composition does not substantially contain magnesium oxide and calcium hydroxide.

Here, the phrase "the fluororubber composition does not substantially contain magnesium oxide and calcium hydroxide" means that magnesium oxide and calcium hydroxide are not contained, or the total content thereof is 0.1 parts by weight or less, preferably 0.05 parts by weight or less relative to 100 parts by weight of the ternary fluororubber polymer.

The fluororubber composition according to the first aspect preferably contains 8 to 60 parts by weight, preferably 10 to 50 parts by weight of the reaction product of silica-aluminum silicate with vinyl ethoxysilane relative to 100 parts by weight of the ternary fluororubber polymer.

This provides effects of exhibiting excellent adhesiveness, exhibiting an excellent permanent compression set in a steam environment, and preventing a change in hardness in a steam environment, The ternary fluororubber polymer preferably has a fluoride content of 64 to 67% by weight from the viewpoint of markedly exhibiting the effects of the present disclosure.

Perfluorovinyl ether as a polymerization component in the ternary fluororubber polymer can be represented by the general formula: $CF_2=CFOR_f$ (wherein $R_f$ represents a perfluoroalkyl group having 1 to 10 carbon atoms).

Examples of the perfluoroalkyl group having 1 to 10 carbon atoms include a perfluoromethyl group.

The ternary fluororubber polymer is preferably peroxide-crosslinkable, and preferably contains iodine and/or bromine in its molecule as a crosslinking site.

As the ternary fluororubber polymer, for example, commercially available products such as "Viton GLT600S" (fluoride content: 64% by weight) and "Viton GTL200S" (fluoride content: 64% by weight) manufactured by E.I. du Pont de Nemours and Company, and "Tecnoflon PL855" (fluoride content: 64% by weight) manufactured by Solvay Solexis Inc. may be used. The ternary fluororubber polymer may be used in a mixture of two or more.

The reaction product of silica-aluminum silicate with vinyl ethoxysilane is not particularly limited as long as it is a reaction product obtained by reacting a silica-aluminum silicate with vinyl ethoxysilane. As the silica-aluminum silicate, for example, commercially available products such as "Sillitin Z86" manufactured by HOFFMANN MINERAL GmbH may be used. As the reaction product of silica-aluminum silicate with vinyl ethoxysilane, for example, commercially available products such as "Actizil VM" manufactured by HOFFMANN MINERAL GmbH may be used.

Thereafter, a fluororubber composition according to a second aspect of the present disclosure will be described.

The fluororubber composition according to the second aspect contains: a ternary fluororubber polymer including vinylidene fluoride, perfluorovinyl ether, and tetrafluoroethylene; a reaction product of silica-aluminum silicate with vinyl ethoxysilane; and hydrotalcite. The fluororubber composition does not substantially contain magnesium oxide and calcium hydroxide.

The fluororubber composition according to the second aspect contains 2 to 55 parts by weight, preferably 3 to 50 parts by weight of the reaction product of silica-aluminum silicate with vinyl ethoxysilane, and 0.5 to 10 parts by weight, preferably 1 to 9 parts by weight of the hydrotalcite relative to 100 parts by weight of the ternary fluororubber polymer.

This provides effects of exhibiting excellent adhesiveness, exhibiting an excellent permanent compression set in a steam environment, and preventing a change in hardness in a steam environment.

The descriptions in the first aspect can be applied for the ternary fluororubber polymer and the reaction product of silica-aluminum silicate with vinyl ethoxysilane used in the second aspect.

Examples of the hydrotalcite used in the second aspect include $Mg_{4.3}Al_2(OH)_{12.6}CO_3 \cdot mH_2O$, $Mg_6Al_2(OH)_{16}CO_3 \cdot 4H_2O$, and $Mg_{4.5}Al_2(OH)_{13}CO_3 \cdot 3.5H_2O$. As the hydrotalcite, for example, commercially available products such as "DHT-4A" manufactured by Kyowa Chemical Industry Co., Ltd. may be used.

It is preferable that the fluororubber composition according to the first or second aspect described above is peroxide-crosslinked for use.

An organic peroxide crosslinking agent can be preferably used for peroxide-crosslinking.

The organic peroxide crosslinking agent is not particularly limited, and examples thereof include 2,5-dimethyl-2,5-di(t-butylperoxy)hexane.

The organic peroxide crosslinking agent is used at a proportion of preferably 0.5 to 5 parts by weight, more preferably 1 to 3 parts by weight relative to 100 parts by weight of the ternary fluororubber polymer.

Other than the components described above, a fluororubber crosslinked product may appropriately contain a crosslinking auxiliary agent, a reinforcing agent such as white carbon, carbon black such as MT carbon black or FEF carbon black, a filler such as graphite, a processing aid such as stearic acid, palmitic acid, or paraffin wax, an antioxidant, a plasticizer, and zinc oxide and the like which are generally used as blending agents for rubber as long as the object of the present disclosure is not impaired.

The fluororubber crosslinked product of the present disclosure is obtained by crosslinking the fluororubber composition described above. The crosslinking is preferably peroxide-crosslinking as described above. The fluororubber crosslinked product of the present disclosure provides effects of exhibiting excellent adhesiveness, exhibiting an excellent permanent compression set in a steam environment, and preventing a change in hardness in a steam environment.

In a preferable method for manufacturing a fluororubber crosslinked product, first, components of a fluororubber composition are kneaded by using a closed-type kneader such as a kneader, an intermix, or a Banbury mixer, or an open roll. Then, the kneaded product is extruded into a sheet-like shape, or formed into a predetermined shape using an extruder or a Bauer machine and the like. Then, the formed product is subjected to crosslinking-molding at a predetermined temperature (preferably 100 to 180° C.) for a predetermined time (preferably for 1 to 30 minutes) using a compression press, a cast-molding machine, or an injection-molding machine and the like. Furthermore, the molded product can be subjected to secondary crosslinking at a predetermined temperature (preferably 200 to 220° C.) for a predetermined time (preferably 1 to 10 hours) using an air oven and the like.

The fluororubber crosslinked product of the present disclosure is suitably used as various sealing members, and particularly an oil sealing for EGR valve. Since the oil sealing for EGR valve containing the fluororubber crosslinked product of the present disclosure exhibits excellent adhesiveness, exhibits an excellent permanent compression set in a steam environment, and prevents a change in hardness in a steam environment, a good sealing can be achieved in a severe environment of the EGR valve.

EXAMPLES

Hereinafter, Examples of the present disclosure will be described, but the present disclosure is not limited thereto.

Hereinafter, a first aspect will be exemplified.

Example 1

1. Preparation of Fluororubber Composition

With 100 parts by weight of the following ternary fluororubber polymer C, 10 parts by weight of a reaction product of silica-aluminum silicate with vinyl ethoxysilane ("Actizil VM" manufactured by HOFFMANN MINERAL GmbH), 3 parts by weight of MT carbon black ("THERMAX N-990LSR" manufactured by CANCARB LIMITED), and 0.1 parts by weight of zinc oxide (quality corresponding to JIS "type 1") were blended. Furthermore, the blended product was blended with 2 parts by weight of an organic peroxide crosslinking agent (2,5-dimethyl-2,5-di-t-butylperoxy)hexane ("Perhexa 25B-40" manufactured by Nippon Oil & Fats Co., Ltd.) and a predetermined blending agent, followed by kneading, thereby obtaining an uncrosslinked fluororubber composition.

Ternary fluororubber polymer A: ternary fluororubber polymer including vinylidene fluoride, perfluorovinyl ether, and tetrafluoroethylene; fluoride content: 64% by weight ("Viton GLT600S" manufactured by E.I. du Pont de Nemours and Company)

Ternary fluororubber polymer B: ternary fluororubber polymer including vinylidene fluoride, perfluorovinyl ether, and tetrafluoroethylene; fluoride content: 64% by weight ("Viton GTL200S" manufactured by E.I. du Pont de Nemours and Company)

Ternary fluororubber polymer C: ternary fluororubber polymer including vinylidene fluoride, perfluorovinyl ether, and tetrafluoroethylene; fluoride content: 64% by weight ("Tecnoflon PL855" manufactured by Solvay Solexis Inc.)

2. Production of Test Piece

A test piece for adhesiveness evaluation, a test piece for evaluation of a permanent compression set in a steam environment, and a test piece for evaluation of prevention of a change in hardness in a steam environment were produced according to the following method using the fluororubber composition.

(1) Test Piece for Adhesiveness Evaluation

The fluororubber composition was molded into a shape of an oil sealing of Φ 85 mm, and the molded product was bonded to a steel plate by press crosslinking at 180° C. for 3 minutes to obtain a test piece for adhesiveness evaluation.

(2) Test Piece for Evaluation of Permanent Compression Set in Steam Environment

The fluororubber composition was molded into a shape of an O ring having a wire diameter of 3.1 mm. The molded product was subjected to press crosslinking at 180° C. for 3 minutes, and the crosslinked product was then held in an atmosphere of 200° C. for 5 hours to obtain a test piece for evaluation of a permanent compression set in a steam environment.

(3) Test Piece for Evaluation of Prevention of Change in hardness in Steam Environment The fluororubber composition was molded into a sheet having a thickness of 2 mm. The molded product was subjected to press crosslinking at 180° C. for 3 minutes, and the crosslinked product was then held in an atmosphere of 200° C. for 5 hours to obtain a test piece for evaluation of prevention of a change in hardness in a steam environment.

3. Evaluation Method (1) Adhesiveness

In the test piece for adhesiveness evaluation, the bonded oil sealing was peeled off by a pincher, and an R remaining rate (%) was measured as the area rate of the remaining rubber. The adhesiveness was evaluated according to the following evaluation criterion based on the measured R remaining rate (%).

<Evaluation Criterion>

AA: The R remaining rate (%) is 80% or more and 100% or less.

A: The R remaining rate (%) is 60% or more and less than 80%.

B: The R remaining rate (%) is 45% or more and less than 60%.

C: The R remaining rate (%) is 0% or more and less than 45%.

(2) Permanent Compression Set in Steam Environment

A permanent compression set (%) in a steam environment was measured based on JIS K6262: 2013. The test environment was a steam environment having a humidity of 95%; the test temperature was 80° C.; and the test time was 96 hours. The permanent compression set was evaluated according to the following evaluation criterion based on the measured permanent compression set (%).

<Evaluation Criterion>

AA: The permanent compression set (%) is 0% or more and 25% or less.

A: The permanent compression set (%) is more than 25% and 28% or less.

B: The permanent compression set (%) is more than 28% and 31% or less.

C: The permanent compression set (%) is more than 31% and 100% or less.

(3) Prevention of Change in Hardness in Steam Environment

A change in hardness in a steam environment was measured based on JIS K6258: 2010. The test environment was a steam environment having a humidity of 95%; the test temperature was 80° C., and the test time was 192 hours. The change in hardness was evaluated according to the following evaluation criterion based on the measured change in hardness (Hw) (Points).

<Evaluation Criterion>

AA: The change in hardness (Hw) (Points) is ±0.

A: The change in hardness (Hw) (Points) is −5 or more and −1 or less.

B: The change in hardness (Hw) (Points) is +1 or more and +5 or less.

C: The change in hardness (Hw) (Points) is more than +5 and +10 or less.

(4) Comprehensive Evaluation

The comprehensive evaluation was made according to the following evaluation criterion based on the evaluation results of the above (1) to (3).

<Evaluation Criterion>

AA: The evaluations of the above (1) to (3) include only A or more.

A: The evaluations of the above (1) to (3) include A or more, and do not include C.

B: The evaluations of the above (1) to (3) include only B.

C: The evaluations of the above (1) to (3) include C.

The above results are shown in Table 1.

Example 2

Each test piece was produced in the same manner as in Example 1 except that the blending amount of a reaction product of silica-aluminum silicate with vinyl ethoxysilane was changed to 15 parts by weight, and evaluated in the same manner as in Example 1. The results are shown in Table 1.

Example 3

Each test piece was produced in the same manner as in Example 1 except that the blending amount of a reaction product of silica-aluminum silicate with vinyl ethoxysilane was changed to 30 parts by weight, and evaluated in the same manner as in Example 1. The results are shown in Table 1.

Example 4

Each test piece was produced in the same manner as in Example 3 except that 2 parts by weight of FEF carbon black ("Seast GS-O" manufactured by Tokai Carbon Co., Ltd.) was blended in place of MT carbon black, and zinc oxide was not blended, and evaluated in the same manner as in Example 1. The results are shown in Table 1.

Comparative Example 1

Each test piece was produced in the same manner as in Example 1 except that 100 parts by weight of a polymer containing 50 parts by weight of a ternary fluororubber polymer A and 50 parts by weight of the ternary fluororubber polymer B was used in place of the ternary fluororubber polymer C in Example 1, and the blending amount of a reaction product of silica-aluminum silicate with vinyl ethoxysilane was changed to 5 parts by weight; and 3 parts by weight of hydrotalcite ($Mg_{4.3}Al_2(OH)_{12.6}CO_3.mH_2O$) ("DHT-4A" manufactured by Kyowa Chemical Industry Co., Ltd.), 6 parts by weight of magnesium oxide ("Kyowamag 150" manufactured by Kyowa Chemical Industry Co., Ltd.), and 3 parts by weight of calcium hydroxide ("CALDIC 2000" manufactured by Ohmi Chemical Co., Ltd.) were blended, and evaluated in the same manner as in Example 1. The results are shown in Table 1.

Comparative Example 2

Each test piece was produced in the same manner as in Comparative Example 1 except that magnesium oxide was not blended, and evaluated in the same manner as in Example 1. The results are shown in Table 1.

Comparative Example 3

Each test piece was produced in the same manner as in Comparative Example 1 except that hydrotalcite, magnesium oxide, and calcium hydroxide were not blended, and evaluated in the same manner as in Example 1. The results are shown in Table 1.

Comparative Example 4

Each test piece was produced in the same manner as in Example 1 except that the blending amount of a reaction product of silica-aluminum silicate with vinyl ethoxysilane was changed to 5 parts by weight, and evaluated in the same manner as in Example 1. The results are shown in Table 1.

TABLE 1

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Fluororubber composition (Part by weight) | Ternary fluororubber polymer A |  |  |  |  | 50 | 50 | 50 |  |
|  | Ternary fluororubber polymer B |  |  |  |  | 50 | 50 | 50 |  |
|  | Ternary fluororubber polymer C | 100 | 100 | 100 | 100 |  |  |  | 100 |
|  | Vinyl ethoxysilane reaction product of silica-aluminum silicate | 10 | 15 | 30 | 30 | 5 | 5 | 5 | 5 |
|  | Hydrotalcite |  |  |  |  | 3 | 3 |  |  |
|  | MT carbon black | 3 | 3 | 3 |  | 3 | 3 | 3 | 3 |
|  | FEF carbon black |  |  |  | 2 |  |  |  |  |
|  | Magnesium oxide |  |  |  |  | 6 |  |  |  |
|  | Calcium hydroxide |  |  |  |  | 3 | 3 |  |  |
|  | Zinc oxide | 0.1 | 0.1 | 0.1 |  | 0.1 | 0.1 | 0.1 | 0.1 |
|  | Organic peroxide crosslinking agent | 2 | 2 | 2 | 2 | 2 | 2 | 2 | 2 |
| Adhesiveness | R remaining rate (%) | 50 | 60 | 90 | 90 | 95 | 40 | 40 | 30 |
|  | Evaluation | B | A | AA | AA | AA | C | C | C |
| Permanent compression set in steam environment | Permanent compression set (%) | 22 | 22 | 23 | 23 | 36 | 30 | 22 | 22 |
|  | Evaluation | AA | AA | AA | AA | C | B | AA | AA |
| Prevention of change in hardness in steam environment | Change in hardness (Hw) (Points) | −2 | −3 | −2 | −2 | +6 | +1 | −2 | −2 |
|  | Evaluation | A | A | A | A | C | B | A | A |
|  | Comprehensive evaluation | A | AA | AA | AA | C | C | C | C |

Evaluation

From Table 1, it is found that the fluororubber compositions according to the first aspect of the present disclosure (Examples 1 to 4) provide effects of exhibiting excellent adhesiveness, exhibiting an excellent permanent compression set in a steam environment, and preventing a change in hardness in a steam environment.

Meanwhile, it is found that in Comparative Examples 1 and 2 containing magnesium oxide and calcium hydroxide, a permanent compression set in a steam environment is inferior and a change in hardness in a steam environment cannot be prevented.

It is found that adhesiveness is inferior in Comparative Examples 3 and 4 in which the content of a reaction product of silica-aluminum silicate with vinyl ethoxysilane is not within the range of 8 to 60 parts by weight, as compared to each of the fluororubber compositions according to the first aspect of the present disclosure (Examples 1 to 4).

Hereinafter, a second aspect will be exemplified.

Example 5

With 100 parts by weight of a polymer containing 50 parts by weight of the following ternary fluororubber polymer A and 50 parts by weight of the following ternary fluororubber polymer B, 5 parts by weight of a reaction product of silica-aluminum silicate with vinyl ethoxysilane ("Actizil VM" manufactured by HOFFMANN MINERAL GmbH), 6 parts by weight of hydrotalcite $(Mg_{4.3}Al_2(OH)_{12.6}CO_3 \cdot mH_2O)$ ("DHT-4A" manufactured by Kyowa Chemical Industry Co., Ltd.), 3 parts by weight of MT carbon black ("THERMAX N-990LSR" manufactured by CANCARB LIMITED), and 0.1 parts by weight of zinc oxide (quality corresponding to JIS "type 1") were blended. Furthermore, the blended product was blended with 2 parts by weight of an organic peroxide crosslinking agent (2,5-dimethyl-2,5-di-t-butylperoxy)hexane ("Perhexa 25B-40" manufactured by Nippon Oil & Fats Co., Ltd.) and a predetermined blending agent, followed by kneading, thereby obtaining an uncrosslinked fluororubber composition. Each test piece was produced and evaluated in the same manner as in Example 1 using the obtained fluororubber composition. The results are shown in Table 2.

Ternary fluororubber polymer A: ternary fluororubber polymer including vinylidene fluoride, perfluorovinyl ether, and tetrafluoroethylene; fluoride content: 64% by weight ("Viton GLT600S" manufactured by E.I. du Pont de Nemours and Company)

Ternary fluororubber polymer B: ternary fluororubber polymer including vinylidene fluoride, perfluorovinyl ether, and tetrafluoroethylene; fluoride content: 64% by weight ("Viton GTL200S" manufactured by E.I. du Pont de Nemours and Company)

Example 6

Each test piece was produced in the same manner as in Example 5 except that the blending amount of hydrotalcite was changed to 9 parts by weight, and evaluated in the same manner as in Example 1. The results are shown in Table 2.

Comparative Example 5

Each test piece was produced in the same manner as in Example 5 except that the blending amount of hydrotalcite was changed to 3 parts by weight, and 6 parts by weight of magnesium oxide ("Kyowamag 150" manufactured by Kyowa Chemical Industry Co., Ltd.) and 3 parts by weight of calcium hydroxide ("CALDIC 2000" manufactured by Ohmi Chemical Co., Ltd.) were blended, and evaluated in the same manner as in Example 1. The results are shown in Table 2.

Comparative Example 6

Each test piece was produced in the same manner as in Example 5 except that the blending amount of hydrotalcite was changed to 3 parts by weight, and 3 parts by weight of calcium hydroxide was further blended, and evaluated in the same manner as in Example 1. The results are shown in Table 2.

Comparative Example 7

Each test piece was produced in the same manner as in Example 5 except that the blending amount of hydrotalcite was changed to 12 parts by weight and evaluated in the same manner as in Example 1. The results are shown in Table 2.

TABLE 2

| | | Example 5 | Example 6 | Comparative Example 5 | Comparative Example 6 | Comparative Example 7 |
|---|---|---|---|---|---|---|
| Fluororubber composition (Part by weight) | Ternary fluororubber polymer A | 50 | 50 | 50 | 50 | 50 |
| | Ternary fluororubber polymer B | 50 | 50 | 50 | 50 | 50 |
| | Ternary fluororubber polymer C | | | | | |
| | Vinyl ethoxysilane reaction product of silica-aluminum silicate | 5 | 5 | 5 | 5 | 5 |
| | Hydrotalcite | 6 | 9 | 3 | 3 | 12 |
| | MT carbon black | 3 | 3 | 3 | 3 | 3 |
| | FEF carbon black | | | | | |
| | Magnesium oxide | | | 6 | | |
| | Calcium hydroxide | | | 3 | 3 | |
| | Zinc oxide | 0.1 | 0.1 | 0.1 | 0.1 | 0.1 |
| | Organic peroxide crosslinking agent | 2 | 2 | 2 | 2 | 2 |
| Adhesiveness | R remaining rate (%) | 60 | 80 | 95 | 40 | 80 |
| | Evaluation | A | A | AA | C | A |

TABLE 2-continued

|  |  | Example 5 | Example 6 | Comparative Example 5 | Comparative Example 6 | Comparative Example 7 |
|---|---|---|---|---|---|---|
| Permanent compression set in steam environment | Permanent compression set (%) | 27 | 30 | 36 | 30 | 32 |
|  | Evaluation | A | B | C | B | C |
| Prevention of change in hardness in steam environment | Change in hardness (Hw) (Points) | −1 | ±0 | +6 | +1 | ±0 |
|  | Evaluation | A | AA | C | B | A |
| Comprehensive evaluation |  | AA | A | C | C | C |

Evaluation

From Table 2, it is found that the fluororubber compositions according to the second aspect of the present disclosure (Examples 5 and 6) provide effects of exhibiting excellent adhesiveness, exhibiting an excellent permanent compression set in a steam environment, and preventing a change in hardness in a steam environment.

Meanwhile, it is found that in Comparative Examples 5 and 6 containing magnesium oxide and calcium hydroxide, permanent compression set in a steam environment is inferior and a change in hardness in a steam environment cannot be prevented.

It is found that permanent compression set in a steam environment is inferior in Comparative Example 7 in which the content of hydrotalcite is not within the range of 0.5 to 10 parts by weight, as compared to each of the fluororubber compositions according to the second aspect of the present disclosure (Examples 5 and 6).

What is claimed is:

1. A fluororubber composition comprising: a ternary fluororubber polymer including vinylidene fluoride, perfluorovinyl ether and tetrafluoroethylene, the ternary fluororubber polymer has a fluoride content of 64 to 67% by weight; and a reaction product of silica-aluminum silicate with vinyl ethoxysilane, wherein the fluororubber composition does not substantially contain magnesium oxide and calcium hydroxide; and the fluororubber composition contains 10 to 60 parts by weight of the reaction product of silica-aluminum silicate with vinyl ethoxysilane relative to 100 parts by weight of the ternary fluororubber polymer.

2. A fluororubber composition comprising: a ternary fluororubber polymer including vinylidene fluoride, perfluorovinyl ether and tetrafluoroethylene, the ternary fluororubber polymer has a fluoride content of 64 to 67% by weight; a reaction product of silica-aluminum silicate with vinyl ethoxysilane; and hydrotalcite, wherein the fluororubber composition does not substantially contain magnesium oxide and calcium hydroxide; and the fluororubber composition contains 5 to 55 parts by weight of the reaction product of silica-aluminum silicate with vinyl ethoxysilane and 0.5 to 9 parts by weight of the hydrotalcite relative to 100 parts by weight of the ternary fluororubber polymer.

3. A fluororubber crosslinked product obtained by crosslinking the fluororubber composition according to claim 1.

4. A fluororubber crosslinked product obtained by crosslinking the fluororubber composition according to claim 2.

5. The fluororubber composition of claim 1, wherein the fluororubber composition contains 10 to 30 parts by weight of the reaction product of silica-aluminum silicate with vinyl ethoxysilane relative to 100 parts by weight of the ternary fluororubber polymer.

6. The fluororubber composition of claim 2, wherein the fluororubber composition contains 5 to 30 parts by weight of the reaction product of silica-aluminum silicate with vinyl ethoxysilane relative to 100 parts by weight of the ternary fluororubber polymer.

7. The fluororubber composition of claim 6, wherein the fluororubber composition comprises 3 to 9 parts by weight of the hydrotalcite relative to 100 parts by weight of the ternary fluororubber polymer.

8. The fluororubber composition of claim 1, wherein the fluororubber composition comprises a peroxide crosslinking agent and zinc oxide, where the zinc oxide being present at 0.1 parts by weight relative to 100 parts by weight of the ternary fluororubber polymer.

9. The fluororubber composition of claim 8, wherein the peroxide crosslinking agent is present at 0.5 to 5 parts by weight relative to 100 parts by weight of the ternary fluororubber polymer.

10. The fluororubber composition of claim 1, wherein the fluororubber composition comprises 0.1 parts by weight or less of a total content of magnesium oxide and calcium hydroxide relative to 100 parts by weight of the ternary fluororubber polymer.

11. The fluororubber composition of claim 2, wherein the fluororubber composition comprises a peroxide crosslinking agent and zinc oxide, where the zinc oxide being present at 0.1 parts by weight relative to 100 parts by weight of the ternary fluororubber polymer.

12. The fluororubber composition of claim 11, wherein the peroxide crosslinking agent is present at 0.5 to 5 parts by weight relative to 100 parts by weight of the ternary fluororubber polymer.

13. The fluororubber composition of claim 2, wherein the fluororubber composition comprises 0.1 parts by weight or less of a total content of magnesium oxide and calcium hydroxide relative to 100 parts by weight of the ternary fluororubber polymer.

14. A fluororubber composition comprising:
a ternary fluororubber polymer including vinylidene fluoride, perfluorovinyl ether and tetrafluoroethylene, the ternary fluororubber polymer has a fluoride content of 64 to 67% by weight;
a reaction product of silica-aluminum silicate with vinyl ethoxysilane, the reaction product of silica-aluminum silicate with vinyl ethoxysilane is present at 10 to 30 parts by weight relative to 100 parts by weight of the ternary fluororubber polymer;
a peroxide crosslinking agent, the peroxide crosslinking agent is present at 0.5 to 5 parts by weight relative to 100 parts by weight of the ternary fluororubber polymer;
wherein the fluororubber composition has a total content of magnesium oxide and calcium hydroxide in the range of 0 to 0.1 parts by weight relative to 100 parts by weight of the ternary fluororubber polymer.

* * * * *